US011132171B1

(12) United States Patent
Markas

(10) Patent No.: US 11,132,171 B1
(45) Date of Patent: Sep. 28, 2021

(54) AUDIO SETTING CONFIGURATION

(71) Applicant: Lenovo (Singapore) Pte. Ltd., Singapore (SG)

(72) Inventor: Tassos Markas, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/995,300

(22) Filed: Aug. 17, 2020

(51) Int. Cl.
*G06F 3/16* (2006.01)
*H04S 7/00* (2006.01)
*H04R 5/04* (2006.01)
*H04R 3/00* (2006.01)

(52) U.S. Cl.
CPC .............. *G06F 3/165* (2013.01); *G06F 3/167* (2013.01); *H04R 3/005* (2013.01); *H04R 5/04* (2013.01); *H04S 7/301* (2013.01)

(58) Field of Classification Search
CPC .... G06F 3/16; H04R 3/00; H04R 5/04; H04R 7/00
USPC ................................ 700/94; 381/57, 101, 80
See application file for complete search history.

(56) References Cited

U.S. PATENT DOCUMENTS

| | | | |
|---|---|---|---|
| 10,771,742 B1* | 9/2020 | Pance | H04N 21/42203 |
| 2008/0140235 A1* | 6/2008 | McLean | G06F 16/40 700/94 |
| 2013/0064380 A1* | 3/2013 | Mahowald | H03G 3/32 381/57 |
| 2014/0219471 A1* | 8/2014 | Deshpande | H04R 3/005 381/92 |
| 2015/0222987 A1* | 8/2015 | Angel, Jr. | G06F 16/639 381/80 |
| 2016/0165031 A1* | 6/2016 | Gopinath | H04M 1/6091 455/569.2 |
| 2016/0373490 A1* | 12/2016 | Sedar | G06Q 10/109 |

* cited by examiner

*Primary Examiner* — Melur Ramakrishnaiah
(74) *Attorney, Agent, or Firm* — Ference & Associates LLC

(57) ABSTRACT

One embodiment provides a method, including: receiving, at an information handling device, an indication of a compatible audio device associated with the information handling device; determining, using a processor, an association between at least one user and the compatible audio device; and dynamically configuring, based on the determined association, audio settings for the information handling device. Other aspects are described and claimed.

20 Claims, 3 Drawing Sheets

AUDIO SETTING CONFIGURATION

BACKGROUND

Individuals frequently utilize information handling devices ("devices"), for example laptop and/or personal computers, tablet devices, smart phones, and the like, to participate in remote meetings. More particularly, an individual may utilize their device to connect to these remote sessions via a meeting application. Using the meeting application, an individual may interact and communicate with other meeting attendees (e.g., via audible input, text input, a combination thereof, etc.), some or all of which may be located in a different geographic location.

BRIEF SUMMARY

In summary, one aspect provides a method, comprising: receiving, at an information handling device, an indication of a compatible audio device associated with the information handling device; determining, using a processor, an association between at least one user and the compatible audio device; and dynamically configuring, based on the determined association, audio settings for the information handling device.

Another aspect provides an information handling device, comprising: a processor; a memory device that stores instructions executable by the processor to: receive an indication of a compatible audio device associated with the information handling device; determine an association between at least one user and the compatible audio device; and dynamically configure, based on the determined association, audio settings for the information handling device.

A further aspect provides a product, comprising: a storage device that stores code, the code being executable by a processor and comprising: code that receives an indication of a compatible audio device; code that determines an association between at least one user and the compatible audio device; and code that dynamically configures, based on the determined association, audio settings.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
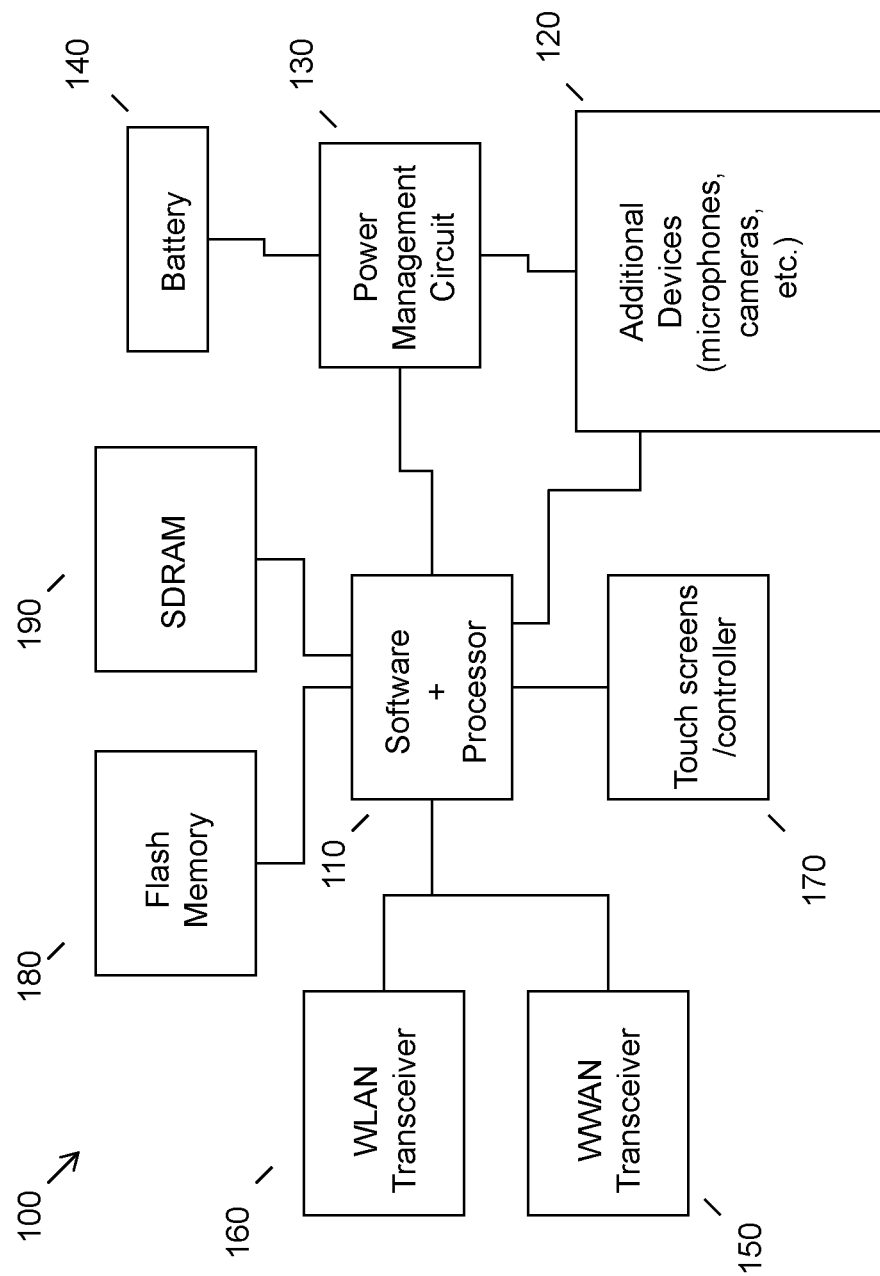
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users often spend a considerable amount of time setting up their input/output devices (e.g., microphone, speakers, etc.) prior to joining a remote meeting (e.g., a conferencing session, etc.). Factors that may influence a user's device selection and/or setting adjustment decisions include: the input/output devices available to the user and/or to their device, the environment the user is presently in (e.g., loud environment vs. quiet environment, etc.), and the nature of the conference meeting (e.g., work-based meeting vs. leisure meeting, etc.).

Configuring audio parameters in a conferencing system has historically been a manual process. More particularly, users conventionally needed to select which input/output devices they wanted to be active for each conferencing session and/or to adjust an input capture range or an audio output level for the selected device(s). Such a requirement, however, may be burdensome and time-consuming to the user.

Accordingly, an embodiment provides a novel method for dynamically configuring audio settings of a device in anticipation of a meeting, remote session, or other relevant activity. In an embodiment, an indication of a compatible input/output audio device may be received by a user's device. The compatible input/output audio device ("audio device") may be: a device that is identified as being connected to the user's device, a device that is not connected to the user's device but is identified as being compatible with the user's device, and a device that may or may not be connected to the user's device but that is in proximity to the user. An embodiment may then determine an association between the user and the compatible audio device (e.g., whether the user wearing the compatible device, whether the compatible device appropriate for the user's current interaction context, etc.) and thereafter dynamically configure one or more audio settings for the device based upon this determination. Such a method may enable a system to identify the optimal audio device setup for a particular conferencing session.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
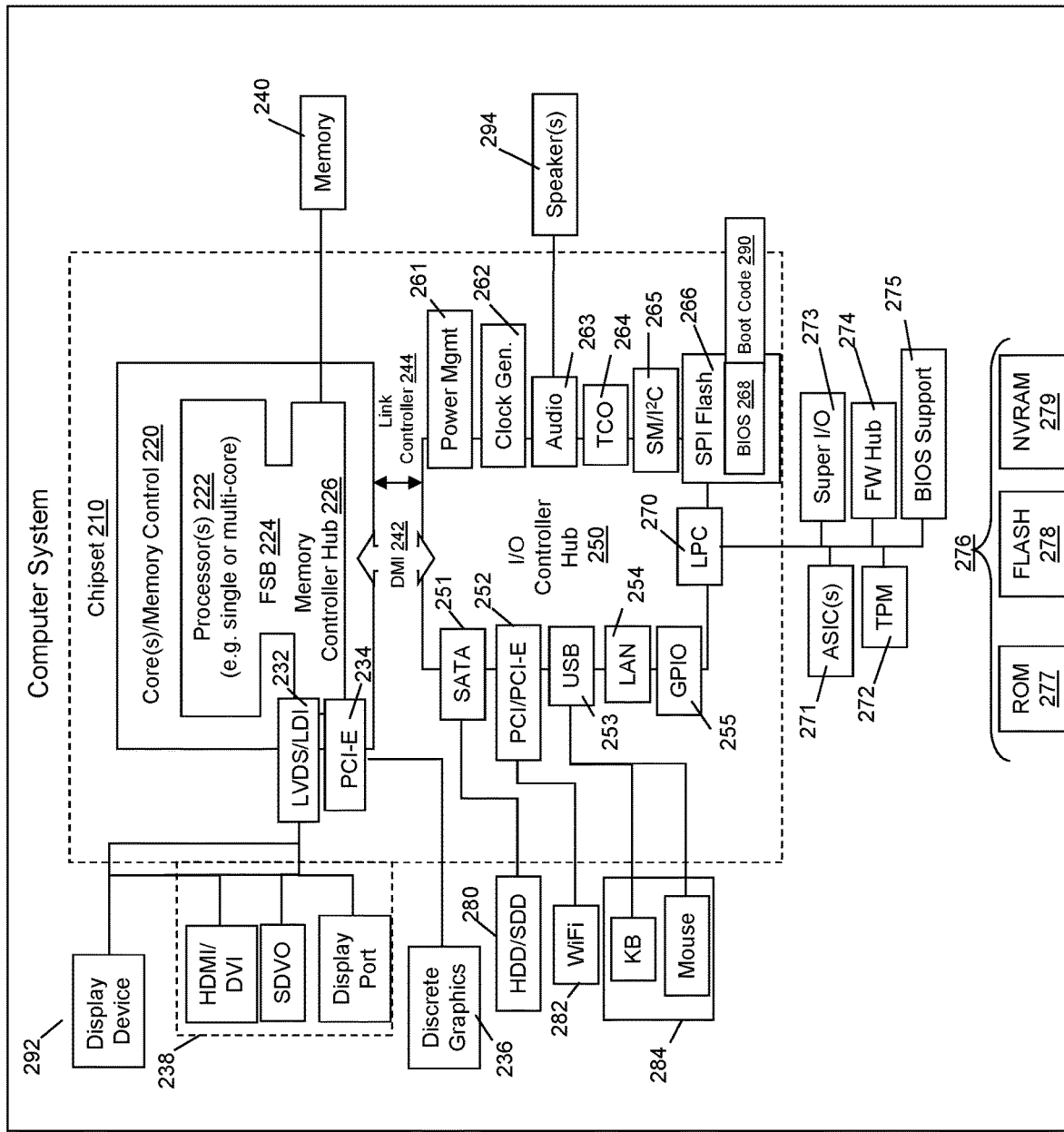
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices capable of connecting to remote conferencing sessions. For example, the circuitry outlined in FIG. 1 may be implemented in a smart phone or tablet embodiment, whereas the circuitry outlined in FIG. 2 may be implemented in a laptop.

Figure 3:
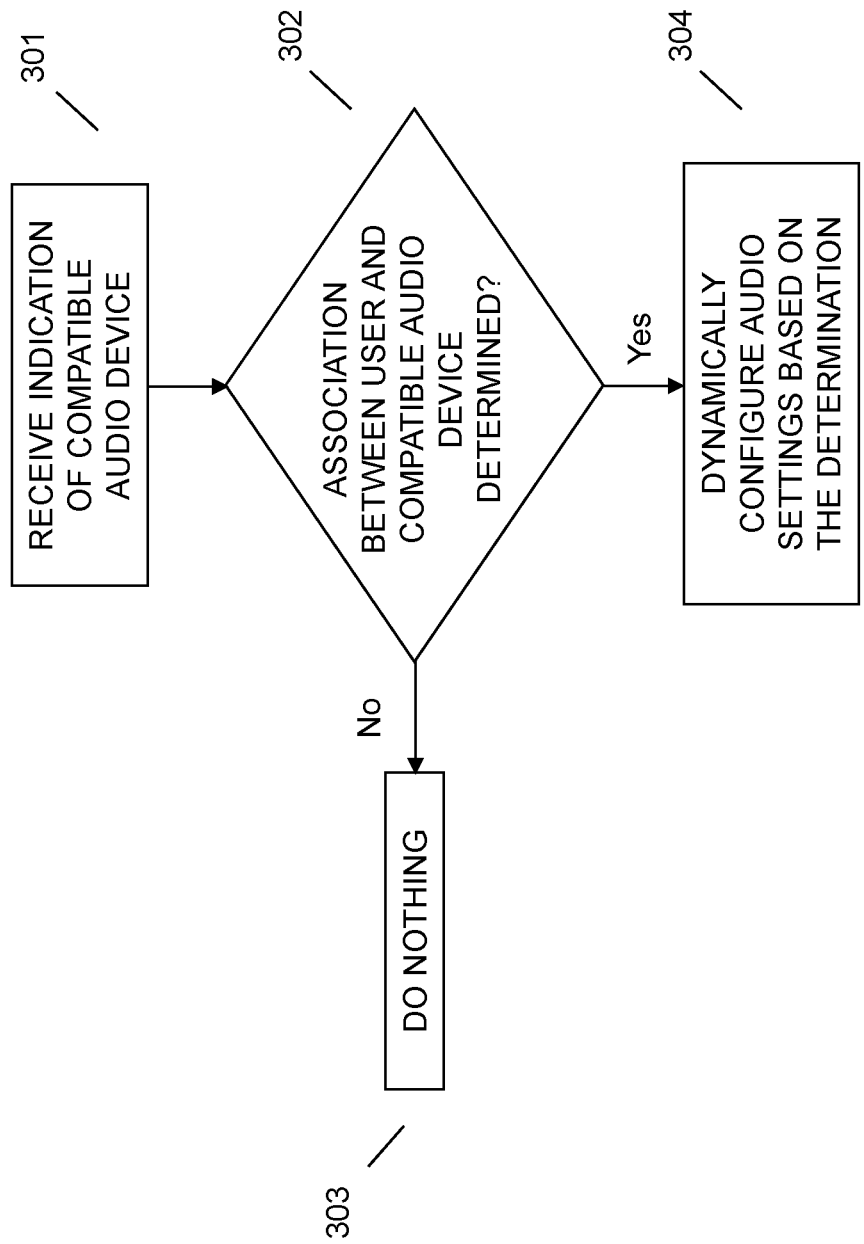
FIG. 3 illustrates an example method of automatically configuring audio settings for a device.

Referring now to FIG. 3, an embodiment provides a method for dynamically configuring the audio settings of a device. At 301, an embodiment may receive an indication of an audio device that is compatible with a user's device. In an embodiment, the audio device may be an audio input device (e.g., stand-alone microphone, headset microphone, etc.) or an audio output device (speaker, headset, etc.). In the context of this application, an audio device that is compatible with the user's device may be one of: an audio device that is connected to the user's device (e.g., via a wired or wireless connection, etc.), an audio device that is not connected to the user's device but is identified as being compatible with the user's device (e.g., using one or more sensors, etc.), or a device that may or may not be connected to the user's device but that is in proximity to a user. In an embodiment, the indication may be received by the user's device at one or more points during device operation. For example, the indication may be received at device initiation, at conference application initiation, upon entrance to the conference meeting, etc.

The indication that the audio device is compatible with the user's device may be received or detected by one or more different means. For instance, the user's device may identify that one or more audio devices have successfully established an appropriate wired or wireless connection with itself. Additionally or alternatively, one or more sensors, integrally or operatively coupled to the user's device, may be utilized to determine whether compatible audio devices are present. For example, the user's device may be equipped with a camera sensor that may capture one or more images and/or videos of the surrounding space. This captured visual content may subsequently be analyzed by the system (e.g., using one or more image/video analysis techniques known in the art, etc.) to determine whether one or more compatible audio devices are present in the surrounding area. More particularly, an embodiment may compare identified objects in the captured visual content to a list of compatible audio devices that are stored in an accessible database (e.g., stored locally on the user's device, stored remotely on another device or server, etc.). If a match is determined to exist, then an embodiment may receive an indication that at least one compatible audio device exists.

At 302, an embodiment may determine an association between a user and the compatible audio device. In the context of this application, the association between the user and the compatible audio device may refer to one or more different things. For example, an embodiment may be able to identify whether a user is presently wearing or using a particular audio device. This identification may be facilitated by using one or more different sensors (e.g., a camera sensor, etc.). In another example, an embodiment may be able to identify a sound profile of a space a user is presently in. More particularly, an embodiment may be able to determine whether the user is in a loud environment, a quiet environment, etc. In yet another example, an embodiment may be able to determine an association between multiple users and the compatible audio device. More particularly, an embodiment may be able to identify that a plurality of users are present in a space (e.g., using a camera sensor, a microphone, etc.).

Responsive to being unable to determine, at 302, an association between the user and the compatible audio device, an embodiment may, at 303, take no additional action. Additionally or alternatively, an embodiment may provide the user with a notification (e.g., a visual notification on a display screen of the user's device, an audible notification using one or more audio output devices, etc.) apprising them that the system could not determine a contextual association between the user and compatible audio devices. Conversely, responsive to determining, at 302, an association between the user and the compatible audio device, an embodiment may, at 304, dynamically configure audio settings for the user's device based on this association. More particularly, an embodiment may identify which of the compatible audio devices (i.e., audio input devices and audio output devices) to accept audio input from and to transmit audio input to. Additionally, an embodiment may make adjustments to default audio settings while also respecting existing user device preferences.

Following are provided a plurality of non-limiting examples of how audio settings of the user's device may be dynamically reconfigured based on a determined association between a user and one or more compatible devices. It is important to note that these examples are not exhaustive and other practical implementations of the concepts described herein, not explicitly mentioned here, may also be applicable.

In an embodiment, the system of a device may reconfigure default audio settings based upon the identification of connected and/or currently utilized compatible audio devices. For example, in the situation where the system determines that a user is not wearing any headphones, an embodiment may reconfigure the default audio settings to receive audible input via a microphone integrated into the user's device and transmit audio output using a speaker integrated into the user's device. As another example, if the system identifies that the user is wearing headphones that do not have any audio input capabilities (i.e., headphones without a microphone), an embodiment may reconfigure the default audio settings to receive audible input via a microphone integrated into the user's device and transmit audio output through the user's headphones.

An embodiment may reconfigure the default audio settings based upon additional context data. For example, responsive to identifying that the environment the user is situated in is louder than a predetermined threshold, an embodiment may automatically reconfigure the default audio settings to receive audio from an audio input device that is either positioned closest to the user's mouth (e.g., a microphone of a user's headset, etc.) or that is determined to be the best at filtering out ambient sound (e.g., a beamforming microphone, etc.). Similarly, an embodiment may transmit audio output through a device that is determined to have the highest probability of transmitting clear audio to the user (e.g., an audio output device closest to the user's ears, an audio output device that is determined to be the loudest, etc.). The converse of the foregoing example embodiments may also be applicable. For example, responsive to identifying that the environment the user is situated in is very quiet, an embodiment may reconfigure the default audio settings to receive audio from an audio input device that is positioned closest to the user's mouth or that is the most sensitive to audio pickup (e.g., in case the user needs to provide input in a hushed tone, etc.). An embodiment may similarly transmit audio output through the audio output device determined to cause the lowest amount of audio disturbance in the user's area (e.g., via the user's headphones, etc.).

In an embodiment, a system may be able to determine that there is a plurality of users in the surrounding area (e.g., using a camera sensor, microphone, etc.). Responsive to making this determination, an embodiment may make one or more adjustments to the audio settings to accommodate the multiple users. For example, if possible, an embodiment may expand an audio pickup range of an available audio input device (e.g., a beamforming microphone, etc.) in an effort to better capture the input from all of the users in the area. Additionally or alternatively, an embodiment may transmit audio output via speakers in order to provide the output to all of the users.

In an embodiment, a system may also be able to provide suggestions to a user for audio setting adjustment. More particularly, an embodiment may determine the user's association with one or more audio devices and thereafter provide a proposed modification to one or more audio settings to maximize a user's interaction experience based upon their association. For example, an embodiment may identify that a user is in a loud environment and that headphones are available to be used by the user (e.g., headphones are positioned proximate to the user, etc.) but that they are not currently being worn by the user. Accordingly, an embodiment may provide a suggestion to the user to wear the headphones because it would likely help them comprehend the transmitted audio better in this loud environment.

The various embodiments described herein thus represent a technical improvement to conventional methods of configuring audio settings. Using these techniques, an embodiment may receive an indication of one or more compatible audio devices associated with the user device. An embodiment may then determine an association between one or more users and the compatible audio device and thereafter dynamically configure, without additional user input, audio settings of the device based upon this association. Such a method may eliminate the existing need for a user to manually configure their audio settings upon entering a conference session and may correspondingly improve a user's conferencing experience.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, an indication of a compatible audio device associated with the information handling device;
   determining an environmental audio context associated with at least one user of the information handling device;
   determining, using a processor, an association between the at least one user and the compatible audio device, wherein the determining the association comprises:
      identifying that the compatible audio device is proximate to the user; and
      identifying that the compatible audio device is optimized for the identified environmental audio context; and
   dynamically configuring, based on the determined association, audio settings for the information handling device, wherein the dynamically configuring comprises providing a suggestion to the user that the compatible audio device is optimal for the environmental audio context.

2. The method of claim 1, wherein the compatible audio device comprises at least one audio input device and at least one audio output device.

3. The method of claim 2, wherein the dynamically configuring comprises designating one of the at least one audio input device and one of the at least one audio output device as a primary audio input device and a primary audio output device.

4. The method of claim 1, wherein the compatible audio device is connected to the information handling device.

5. The method of claim 1, wherein the compatible audio device is in an area proximate to the at least one user.

6. The method of claim 1, wherein the determining the association comprises capturing, using a microphone, an audio profile of a space associated with the at least one user.

7. The method of claim 6, wherein the dynamically configuring comprises dynamically adjusting an audio input range of an audio input device to accommodate the audio profile.

8. The method of claim 1, wherein the determining the association comprises capturing, using a camera, at least one image of the at least one user.

9. The method of claim 8, further comprising determining, based on the captured at least one image, a position of the compatible audio device with respect to the at least one user.

10. The method of claim 1, further comprising providing, based on the determined association, a suggestion to the at least one user of an optimal audio interaction context.

11. An information handling device, comprising:
a processor;
a memory device that stores instructions executable by the processor to:
receive an indication of a compatible audio device associated with the information handling device;
determine an environmental audio context associated with at least one user of the information handling device;
determine an association between the at least one user and the compatible audio device, wherein the determining the association comprises:
identifying that the compatible audio device is proximate to the user; and
identifying that the compatible audio device is optimized for the identified environmental audio context; and
dynamically configure, based on the determined association, audio settings for the information handling device, wherein the dynamically configuring comprises providing a suggestion to the user that the compatible audio device is optimal for the environmental audio context.

12. The information handling device of claim 11, wherein the compatible audio device comprises at least one audio input device and at least one audio output device.

13. The information handling device of claim 12, wherein the instructions executable by the processor to dynamically configure comprise instructions executable by the processor to designate one of the at least one audio input device and one of the at least one audio output device as a primary audio input device and a primary audio output device.

14. The information handling device of claim 11, wherein the compatible audio device is connected to the information handling device.

15. The information handling device of claim 11, wherein the compatible audio device is in an area proximate to the at least one user.

16. The information handling device of claim 11, wherein the instructions executable by the processor to determine the association comprise instructions executable by the processor to capture, using a microphone of the information handling device, an audio profile of a space associated with the at least one user.

17. The information handling device of claim 16, wherein the instructions executable by the processor to dynamically configure comprise instructions executable by the processor to dynamically adjust an audio input range of an audio input device to accommodate the audio profile.

18. The information handling device of claim 11, wherein the instructions executable by the processor to determine the association comprise instructions executable by the processor to capture, using a camera of the information handling device, at least one image of the at least one user.

19. The information handling device of claim 18, wherein the instructions are further executable by the processor to determine, based on the captured at least one image, a position of the compatible audio device with respect to the at least one user.

20. A product, comprising:
a storage device that stores code, the code being executable by a processor and comprising:
code that receives an indication of a compatible audio device;
code that determines an environmental audio context associated with at least one user of the information handling device;
code that determines an association between at least one user and the compatible audio device, wherein the code that determines the association comprises:
code that identifies that the compatible audio device is proximate to the user; and
code that identifies that the compatible audio device is optimized for the identified environmental audio context; and
code that dynamically configures, based on the determined association, audio settings, wherein the code that dynamically configures comprises code that provides a suggestion to the user that the compatible audio device is optimal for the environmental audio context.

* * * * *